Oct. 22, 1929.  W. T. TRACY  1,733,105
FOOTWEAR AND PROCESS OF MANUFACTURING THE SAME
Filed Feb. 25, 1927  4 Sheets-Sheet 1

Inventor:
Wilfred T. Tracy,
by Roberts Cushman Woodberry
attys.

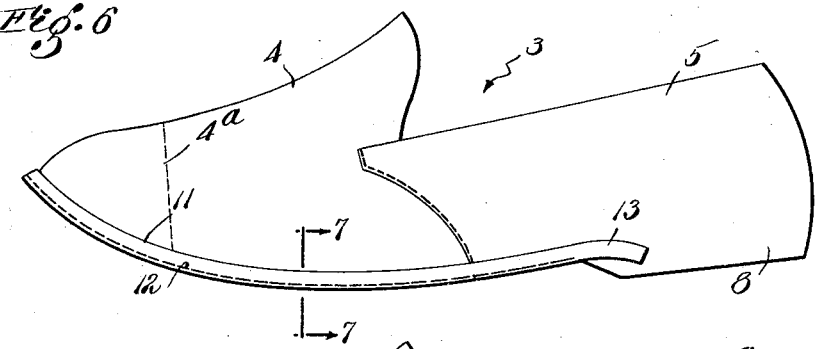
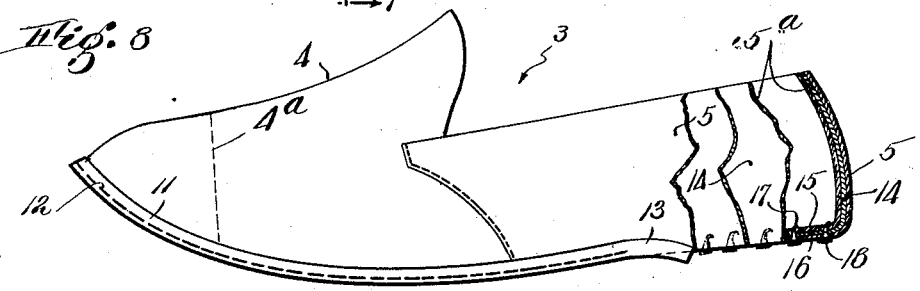
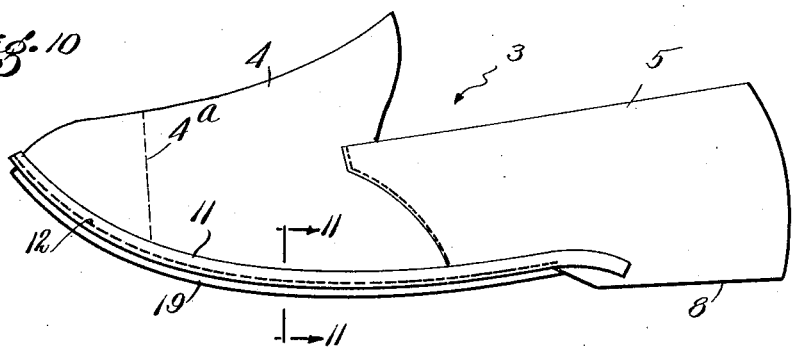
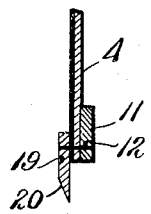
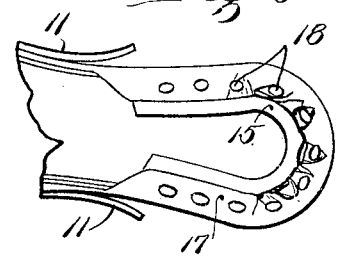

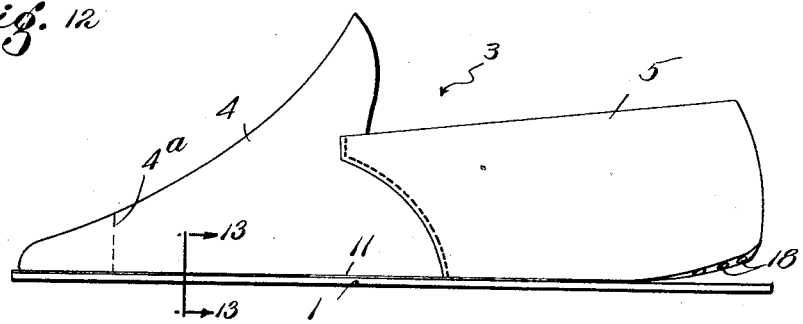
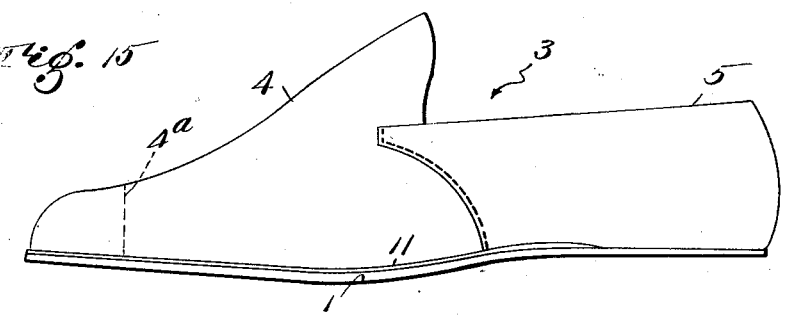
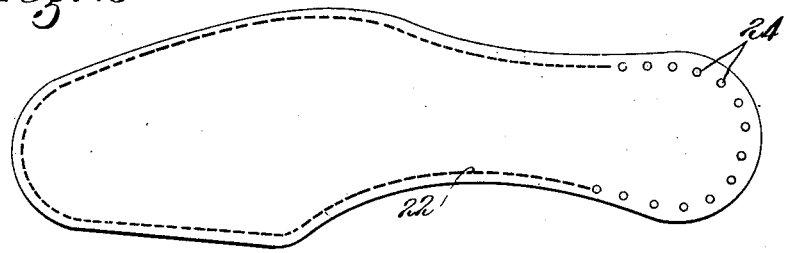
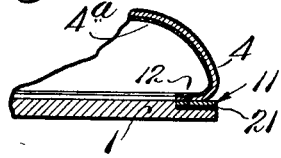
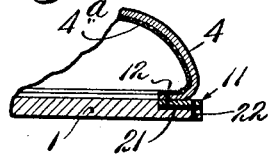
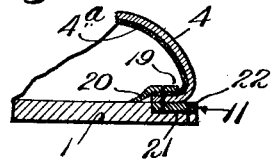
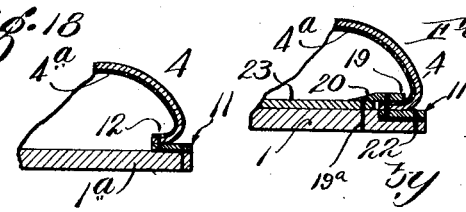

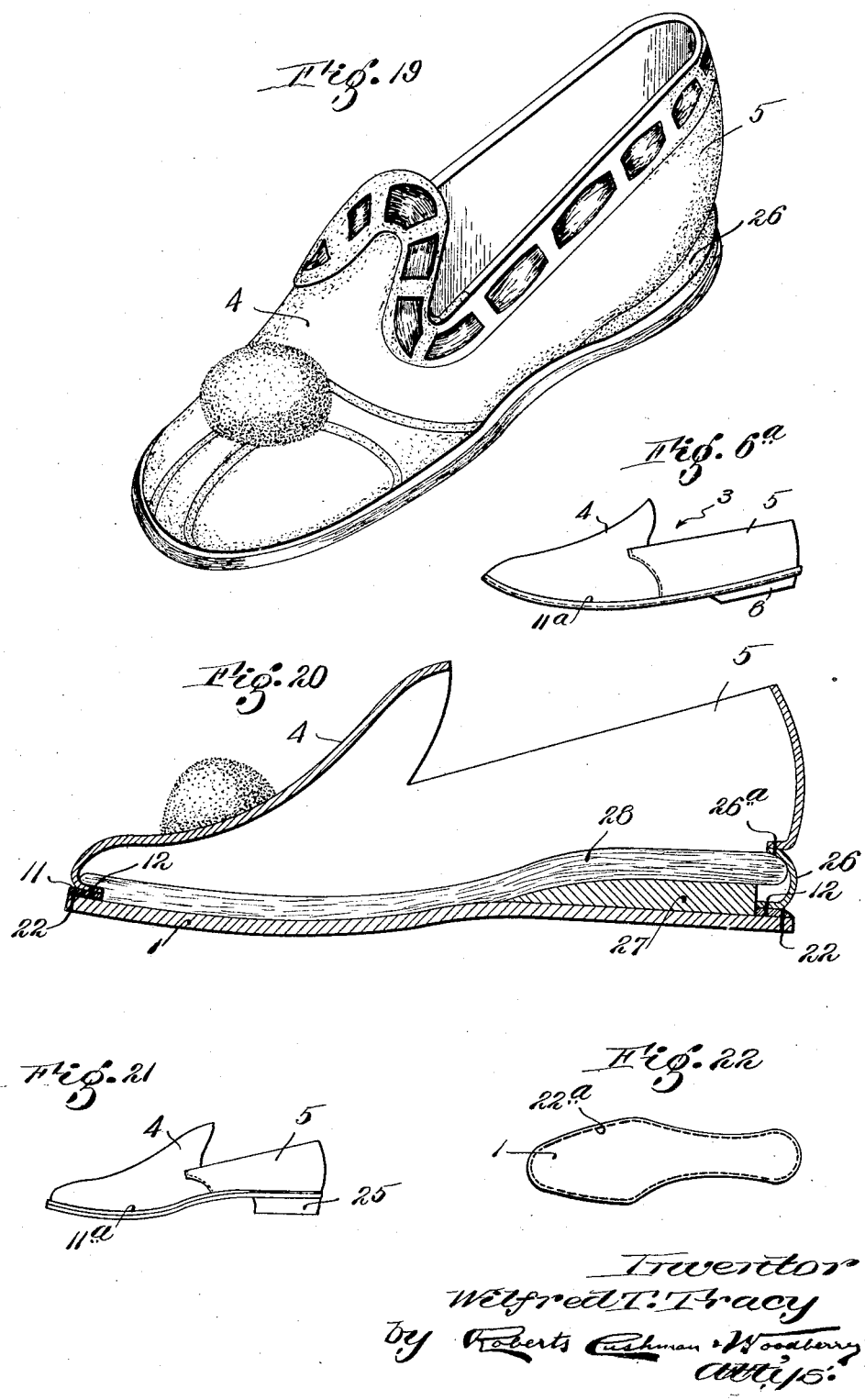

Patented Oct. 22, 1929

1,733,105

UNITED STATES PATENT OFFICE

WILFRED T. TRACY, OF LYNN, MASSACHUSETTS, ASSIGNOR TO TRACY FOOTWEAR PROCESS INC., OF BOSTON, MASSACHUSETTS, A CORPORATION OF MASSACHUSETTS

FOOTWEAR AND PROCESS OF MANUFACTURING THE SAME

Application filed February 25, 1927. Serial No. 170,933.

This invention pertains to footwear and more particularly to a method of making footwear and to an article of footwear resulting from the practice of the method, and the invention as herein illustrated is embodied in a slipper. The invention pertains to that class of footwear in which the sole and upper are united by means of a welt, the present application being a continuation in part of my application Serial No. 555,264, filed April 18, 1922.

In accordance with the present invention I dispense with the usual lasting process and in lieu thereof I cut and fit the upper more accurately than usual by means of properly designed patterns so that there is substantially no waste material at the edge of the upper, and after sewing a welt to the edge of the upper I attach the welt directly to the outer sole by appropriate means or a combination of means, using the edge of the sole or a shoulder provided thereon as a guide in positioning the welt. In order to produce an acceptable shoe or slipper I find certain intermediate or additional steps essential, or desirable, among them being the shaping of the toe portion of the upper prior to attachment of the welt. While this may be done in other ways, I prefer to accomplish it by the employment of an ordinary dry thread sewing machine which, by the use of a suitably adjusted tension by the provision of a usual type of gathering attachment, forms folds or puckers in the edge portion of the toe of the upper, thereby producing a toe pocket.

While I may extend the attaching welt completely around the shoe or slipper, I prefer to terminate it just forward of the heel in a manner common in welted footwear. I may insert a molded counter between the lining and outer member of the upper at the heel end of the shoe and draw and the lower edge of the outer member of the upper over the flange of the counter and secure it by means of tacks or other suitable fastening elements. In performing this latter operation I find it convenient to make use of an ordinary counter-molding press or its equivalent which draws the upper smoothly over the counter and conforms its lower edge to the flange of the counter, although it is possible to accomplish the desired result in other ways and by other instrumentalities. The insertion of the counter within the upper preferably takes place prior to attaching the welt to the sole, and after the counter has been placed in position and its edge secured to the inturned edge of the upper, I attach the counter to the sole by means of tacks, stitches or other suitable fasteners which pass through the sole, the inturned edge of the upper and the flange of the counter.

After the sole has thus been attached to the upper, I introduce a last into the shoe, as is commonly done at a similar stage in the process in the manufacture of turned shoes, and while mounted upon this last the upper is finished, being subjected to any of the usual processes for conforming it to the last, such for example as ironing. Since the last remains within the shoe only during the finishing process, a great economy in the use of lasts is effected and the cost of production is decreased to a very large extent by the elimination of the usual lasting process.

In certain types of shoe,—for example, shoes of high grade, it is desirable to provide a good interior finish and to conform the inner surface of the inner sole closely to the shape of the foot of the wearer. To this end I may attach a second welt to the upper, preferably at the same time that I attach the first-named welt and conveniently by means of the same fastener elements. Preferably this second welt is bevelled or tapered in thickness and its free edge lies against the upper surface of the sole at the inside of the upper, forming a flap which conceals the line of union of the upper and sole.

If desired, this flap or free edge portion of the inner welt may be united by stitches or other suitable fastening means to the sole, thus also adding to the strength and durability of the shoe. If an inner or slip sole be provided, the inner welt bridges the gap between the inner edge of the upper and the edge of the inner sole thus providing a smooth finish and at the same time causing the upper surface of the sole to have a generally concave contour and providing a properly shaped support for the sole of the foot.

Various other and minor but desirable features of construction will be pointed out in the following more detailed description in which reference will be had to the accompanying drawings illustrating by way of example desirable steps in the proposed preferred process together with the products resulting from the employment of such steps. In the accompanying drawings.

Figure 1:
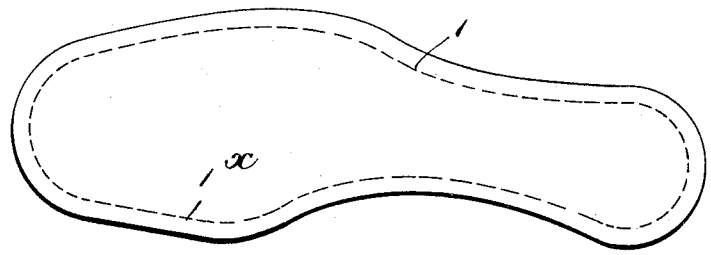
Fig. 1 is a plan view of an outer sole of ordinary construction.
Figure 2:
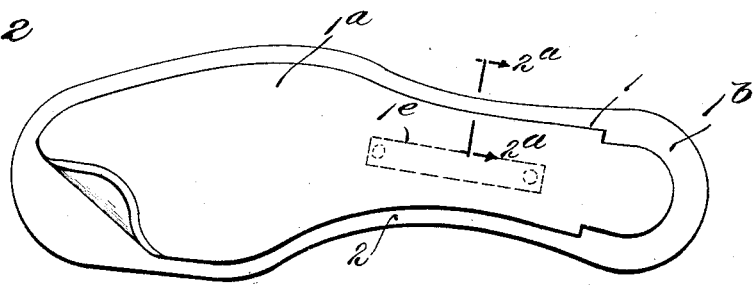
Fig. 2 is a plan view of an outer sole having a marginal recess or rabbet in its upper surface.
Figure 3:
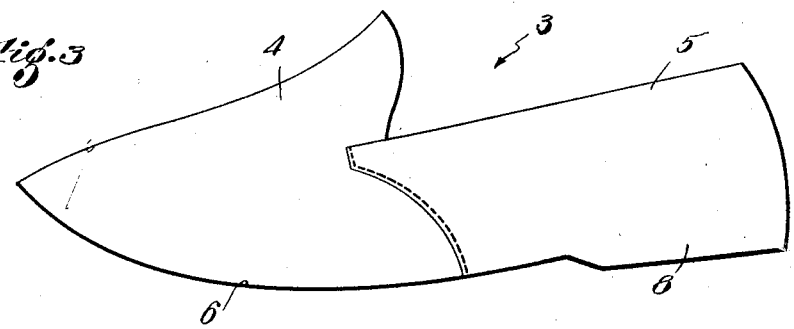
Figure 4:
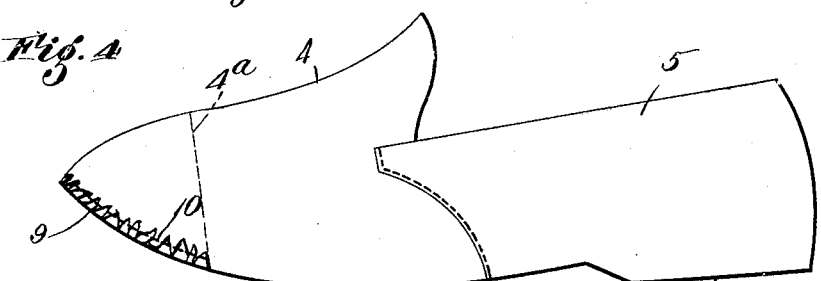
Figure 5:
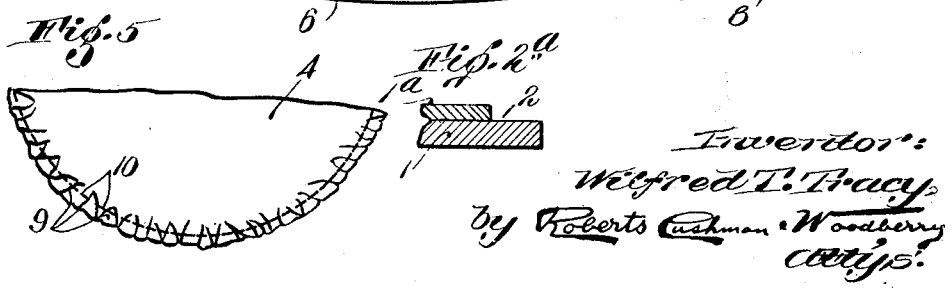

Fig. 2$^a$ is a fragmentary vertical section on the line 2$^a$—2$^a$ of Fig. 2;

Fig. 3 is a side elevation of an upper comprising the usual parts united by means of sewed seams and having an outer member which may be of leather or the like and a suitable lining consisting for example of woven material;

Fig. 4 is a side elevation of the same upper showing the lower edge of its toe portion puckered or gathered to form a toe pocket;

Fig. 5 is a fragmentary front elevation of the toe pocket of Fig. 4 but to larger scale;

Fig. 6 is a side elevation of the upper of Fig. 4 but having a welt attached to its lower part, the welt engaging the outer surface of the upper;

Fig. 6$^a$ is a view similar to Fig. 6 but showing the welt extending entirely around the upper;

Fig. 7 is a fragmentary section on the line 7—7 of Fig. 6;

Fig. 8 is a view similar to Fig. 6 but showing the rear portion of the upper in vertical section with the outer member of the upper broken away to disclose the counter enclosed between the outer member and the lining of the upper;

Fig. 9 is a fragmentary bottom plan view of the rear end of the upper shown in Fig. 8;

Fig. 10 is a side elevation of an upper such as shown in Fig. 6 but illustrating a modification in which the upper is provided with both inner and outer welts;

Fig. 11 is a section substantially on the line 11—11 of Fig. 10;

Fig. 12 is a side elevation showing a sole engaging the welt, the rear portion of the sole being unattached to the upper;

Fig. 13 is a fragmentary section substantially on the line 13—13 of Fig. 12, showing the welt attached to the sole by means of adhesive only;

Fig. 14 is a section similar to Fig. 13 showing the welt secured to the sole by means of a sewed seam;

Fig. 15 is a side elevation of the shoe substantially complete, but omitting the heel;

Fig. 16 is a bottom plan view of the shoe shown in Fig. 15;

Fig. 17 is a section similar to Fig. 13 but illustrating a modified construction employing an inner welt such as indicated in Fig. 10;

Fig. 17$^a$ is a section similar to Fig. 17 but showing the shoe provided with an inner sole;

Fig. 18 is a section similar to Fig. 13 but showing a further modification in which the sole is unprovided with a marginal rabbet;

Fig. 19 is a perspective view illustrating a slipper embodying the present invention;

Fig. 20 is a vertical section through the slipper shown in Fig. 19;

Fig. 21 is a side elevation of a completed slipper or low shoe having a welt which extends entirely around it; and Fig. 22 is a plan view of the shoe or slipper shown in Fig. 21, but omitting the heel.

Referring to the drawings, the numeral 1 designates an outer sole of any usual material and consisting of one or more plies, such sole being of uniform thickness throughout. Such a sole may be employed in the practice of the present process, and, if desired, to facilitate certain steps hereinafter described, the upper surface of this sole may be furnished with a guide line 1$^x$ spaced inwardly from its edge. However, I prefer to provide the upper side of the sole with a marginal recess or rabbet 2, as shown in Figs. 2 and 2$^a$.

If the sole consists of a single ply, this recess or rabbet 2 may be formed by channeling in a well-known manner, but I find it convenient, and in many cases cheaper, to make the sole of two plies, the upper ply 1$^a$ being enough smaller than the lower or bottom ply to provide the desired space or rabbet at the edge, the two plies being permanently united in any desired and convenient manner. Preferably, the recess or rabbet is widened at the rear end of the sole, as shown at 1$^b$, Fig. 2, to provide suitable space for the flange of a molded counter, as hereinafter described. The rabbet 2, however, formed, is preferably of rectangular contour to accommodate a welt hereinafter described, the welt being of substantially the same cross-sectional size and contour as the rabbet.

The use of a two-ply sole facilitates the introduction of a suitable shank piece which is inserted between the plies of the sole before they are united. Such a shank piece is indicated in dotted lines at 1$^c$, in Fig. 2, and may be of steel or any other suitable material.

An upper 3 is made in any usual way, such upper comprising for example the forepart 4 and the rear parts 5. In making this upper I fit it much more closely and accurately than is usual, by the use of specially formed patterns, so that when complete there is but little waste material along the lower edges 6 of the upper. However, I preferably provide a certain amount of surplus material near the heel portion of the upper as indicated in 8 to permit this portion of the upper to be turned inwardly as will hereinafter be described. The several members of the upper may be made of any of the usual materials, such for example as leather or the like, and preferably each of the parts of the upper is furnished with a lining in the usual way.

After the several parts of this closely fitted upper have been united, I prefer to shape the forepart or toe end of the upper to provide a toe pocket. Prior to forming this toe pocket, or at a later stage in the process, as may be most desirable, I may associate with the upper a piece of stiffening material 4ª, for example, felt or cloth impregnated with a binding or stiffening compound. Ordinarily this stiffening will be inserted between the lining and outer member of the upper at the forepart to form a stiffened or box toe. This stiffening material may take the form of a flat blank which receives the desired shape during the initial formation of the toe pocket or during the finishing operation, as hereafter described, or it may be a permanently molded toe box of suitable type, over which the upper may be drawn in the shaping of the toe pocket. In either case, I prefer to secure the stiffener to the upper by means of adhesive, stitches, or other appropriate means, preferably attaching the stiffener to the welt hereinafter described.

In shaping the toe pocket I may employ a molding process, subjecting the forepart of the upper to the action of suitable dies, heated if necessary, but preferably I contract the edge of the upper at its forepart as indicated in Fig. 4 to form gathers or puckers 9. This operation is conveniently performed by the employment of a dry thread sewing machine of any usual type which may be provided with a specially arranged tension for drawing the thread to produce the puckers or which alternatively may be furnished with any of the gathering attachments which are commonly provided for use upon sewing machines of known construction. The gathers or puckers 9 cause the forward end of the upper to assume an internally concave form thus providing a toe pocket.

Referring to Figs. 6 and 7 the next step in the operation consists in attaching a welt 11 to the lower part of the upper against its outer surface. This welt consists of a strip of suitable material for example, leather, and may be of substantially the type commonly employed for attaching outer soles to the inner sole and upper of a Goodyear shoe, although usually narrower than the Goodyear welt. As above stated this welt is of such cross-sectional contour as to correspond to the rabbet 2 in the outer sole and when the welt is seated in this rabbet its upper surface is substantially flush with the upper surface of the central portion of the sole.

I preferably attach the welt 11 to the upper by means of a sewed seam 12 which may be formed upon any suitable sewing machine, the stitches passing through the welt, the outer members of the upper, preferably the stiffener, if the latter be employed, and through the lower edge portion of the lining, thus anchoring the lining firmly in place.

In attaching the welt 11 I cause it to lie against the outer surface of the upper as indicated in Fig. 7 and with its lower edge substantially flush with the lower edge of the upper.

This welt extends around the forward portion of the upper along the lower margin of the toe pocket and is extended rearwardly to a point adjacent to the heel end of the upper, terminating as indicated for example at 13 in Fig. 6. However, under some circumstances I may prefer to carry this welt completely around the upper as indicated for example in Fig. 6ª where such a continuous welt 11ª is indicated. In the latter case this welt preferably is so attached at the rear part of the upper as to leave projecting below it the extra material 8 which as above stated is at a later time turned in beneath the counter.

After attaching the welt 11 I prefer to introduce a molded counter 14 (Figs. 8 and 9) between the outer member 5 at the rear part of the upper and the corresponding lining member 5ª. This counter is provided with a flange 15, and after placing the counter between the inner and outer members of the upper I turn the lower parts of the members 5 and 5ª so as to bring them into contact with the flange 15. While this operation of turning in the parts 16 and 17 may be accomplished in various ways I find it convenient to employ for this purpose an ordinary counter-molding press. By disposing the rear part of the upper over the platen of this press I find that the operation of the press draws the edge of the upper smoothly down into contact with the counter 15 at a single operation and in a perfectly satisfactory manner. After the lower edge portion of the upper has thus been laid into contact with the counter flange 15 I prefer to secure the parts in position by means of a suitable adhesive or other type of fastening means, such for example as stitches or the tacks 18 which are driven in preferably from the outside and are clenched over against the inner surface of the lining.

In a modified construction as indicated in Figs. 10 and 11 I secure a second welt 19 to the lower edge portion of the upper. This welt 19 is disposed against the inner surface of the upper and is secured to the upper by suitable fastener means, for example by means of the same seam 12 which attaches the welt 11 to the upper, although if desired other fastening means may be employed.

This inner welt 19 projects beyond the lower edge of the upper and preferably this projecting portion of the welt 19 is bevelled or tapered in thickness as indicated at 20 (Fig. 11).

Having thus prepared the upper and provided it with one or two welts, as the case may be, I proceed to turn in the edge portion of the upper as indicated in Fig. 13 so as to cause the welt or welts to lie in a substantially horizontal plane or planes. The turning in of the upper may be progressive, if desired; that is the operation may begin at one end of the welt and progress toward the other end, but before performing this operation I preferably coat the under side of the welt with a suitable adhesive, for example rubber cement or one of the more powerful and permanent nitro-cellulose adhesives. I may also coat the rabbet or recess 2 in the sole 1, if such recess be employed, with adhesive. After the edge portion of the upper has been turned in, or while progressively turning in this portion of the upper, the under side of the welt 11, that is to say the side having the adhesive coating, is laid into contact with the adhesive coating 21 on the sole 1. If the sole be provided with a rabbet or recess 2, this rabbet or recess provides a suitable guide shoulder for laying the welt in position since it is merely necessary to dispose the welt within this recess in order to be sure that it is in proper relation to the edge of the sole. However, if such recess be not employed, the edge of the sole itself may be used as a guide in placing the welt in position or the sole may alternatively be provided with a suitable guiding mark or rib extending along its edge and spaced from the latter.

If desired, the welt may be subjected to pressure of more or less sustained character to cause it to adhere firmly to the sole, although ordinarily the relatively slight pressure employed in laying the welt in position is sufficient. However, if a powerful adhesive, such for example as a nitro-cellulose or celluloid cement be employed, with the object of dispensing with further fastening means, it is desirable to subject the welt and sole to prolonged and high pressure.

Ordinarily, after the welt has been stuck to the sole in a temporary manner by the use of rubber cement or the like, I attach it permanently to the sole by means of a series of fastener elements, for example stitches 22 which may be formed by hand or by means of any suitable type of machine. These stitches, as may be noted in Fig. 14, extend through the entire thickness of the sole and welt and preferably perpendicularly to the upper surface of the sole. The stitches of the seam 12 also preferably extend perpendicularly to the surface of the sole and through the upper and the entire thickness of the welt.

After the welt and sole have been united by the stitches 22, as illustrated in Fig. 16, the heel portion of the upper is laid into contact with the sole and the parts are united by suitable fastening means. While adhesive, stitches, or staples may be employed, I ordinarily use nails, as indicated at 24, in Fig. 16, such nails or other fastener elements being inserted by hand or appropriate machinery and passing through the outer sole, the inturned edge of the upper, the flange of the molded counter and the lining. If the sole have the widened recess 1$^b$ at its rear end, as shown in Fig. 2, the molded flange of the counter seats in this recess so that the inner surface of the outer sole of the completed shoe is substantially level, and the inner sole, if employed, is smooth and comfortable to the foot of the wearer.

If, as indicated in Figs. 10 and 11, a second or inner welt 19 be provided, I dispose this inner welt so that it overlies the upper surface of the sole 1 as shown in Fig. 17. In this figure the bevelled or tapering portion 20 of the welt extends down and rests directly upon the upper surface of the sole 1, thus covering the abrupt edge of the upper and providing a smooth and more or less concave surface at the edge of the shoe adapted to form a proper support for the sole of the foot.

In Fig. 17$^a$ the shoe is shown as provided with an inner sole or slip sole 23. In this case the bevelled or tapering inwardly projecting portion 20 of the inner welt 19 extends across the gap between the edge of the upper and the edge of this inner or slip sole thus forming a smooth joint and producing a desirable finish for the interior of the shoe. That portion of the inner welt 19 which projects beyond the edge of the upper is preferably anchored to the sole or inner sole, for example, by means of adhesive, but preferably by stitches or other fasteners, as indicated at 19$^a$, passing through the inner welt and the outer sole, thus adding very materially to the strength and durability of the shoe.

In Fig. 18 I have illustrated a sole 1$^a$ which is unprovided with a rabbet at its edge, and in this case the welt 11 rests directly upon the upper surface of the sole. In other respects this arrangement is quite similar to that shown in Fig. 13.

In Fig. 19 I have illustrated the invention as applied to a slipper having an upper which in this instance may be of felt or other soft material. In this arrangement I prefer to provide the rear portion of the upper with a downwardly extending flap 26 which may conveniently be formed from a separate piece of material and is secured to the main portion of the upper by stitches at 26ª. I have shown the welt 11 extending entirely around this slipper, the welt being connected to the forepart 4 of the upper and at its rear part to the lower edge of the flap 26. The sole 1 is secured to this welt by the stitches 22, but in this instance I omit the flanged counter. The flap 26 provides suitable space for the reception of a heel member 27 disposed above the rear part of the sole 1. This heel member 27 may be of hard or soft material if desired and may be secured to the sole in any desired way, for example by means of tacks or adhesive. Preferably the forward part of this heel member 27 is bevelled or tapered and upon the upper surface of this heel member and upon the forepart of the sole 1 I arrange a cushion sole 28. This cushion sole consists of a thick piece of felt or other suitable material and is inserted after the other parts of the shoe have been assembled. This cushion sole 28 is attached by means of rubber cement or other adhesive.

In Figs. 21 and 22 I have also illustrated a slipper or low shoe but in this instance as in Figs. 19 and 20 the welt 11ª extends entirely around the shoe, the sole being attached to this welt by means of a continuous seam 22ª. In Fig. 21 I have also indicated a heel 25 exterior to the sole and which may be secured in position by means of nails or other fasteners in a manner well known in the art.

After the sole has been attached and preferably after the inner sole has been placed in position, although it is optional whether the inner sole be used or not, a last is introduced into the upper and the shoe is finished while upon this last. If desired the upper may be moistened before inserting the last and permitted to dry while on the last, thus causing it to conform accurately to the contour of the last. It also may be subjected to any of the usual finishing operations such for example as treeing, commonly comprising ironing with a warm iron, to cause it to assume the shape of the exterior surface of the last. If an external heel is to be applied this heel may be secured in position after the introduction of the last and any other usual finishing operations may be performed before the last is withdrawn.

When the shoe is finished the last is withdrawn and the shoe is ready for packing and shipment. It may be noted that during this process there is no ordinary lasting of the upper such as is usually thought necessary according to usual processes of shoemaking. It is thus possible to dispense with much expensive machinery and labor which is ordinarily employed in making shoes, as the application of the upper to the sole may be performed by relatively unskilled labor and at a very low cost. The initial fitting of the upper is performed by the use of proper patterns which are used in cutting out the parts of the upper and it is well within the skill of the experienced shoemaker to design patterns to give this desired close fit. The close fitting of the upper avoids waste of the very expensive upper stock, while the employment of outer soles which may be cut substantially to final shape and size before they are attached to the upper, also reduces waste, and materially lessens the cost of the shoe.

Since the lasts are only used after the shoe has been assembled and made up they are in use a comparatively short time as compared with the ordinary processes of shoemaking and thus the manufacturer is not obliged to carry in stock so large a number of lasts as is usual which is a very material item in the cost of manufacturing footwear. On the other hand, shoes and slippers made in accordance with the present process are substantially as accurate in size as when the usual lasting processes are employed and have as attractive and saleable appearance as ordinary shoes. However, while the shoe is a true welt shoe, it does not possess certain of the disadvantages of other types of welt shoes since the sole is flat and requires no filler between the inner and outer sole elements. The wearing qualities of the shoe are thus better than usual while the shoe is capable of repair in the same way as welt shoes of the ordinary construction.

While I have disclosed certain desirable steps in the process of making the improved shoe I wish it to be understood that other and equivalent steps may be substituted therefor and that I do not wish to be limited to the particular order of steps herein recited and that I may vary the order of procedure as circumstances may warrant. It is also to be understood that I do not wish to be limited to the materials which I have mentioned herein or to the particular size or form of the shoe. I have herein referred to the upper as provided with a lining, but such lining may be dispensed with if desired and on the other hand I may, if I wish, interpose between the lining and the outer member of the upper any usual backing material such as is commonly employed in the shoemaking art, and where I have referred to a "lining" hereinabove I wish this term to be construed as inclusive of a backing material if such be employed.

Having thus described the preferred series of steps useful in carrying my invention into effect, together with an upper provided with a welt and other accessories ready for application to the sole, and also a completed shoe embodying my invention.

I claim:

1. That process of making footwear which comprises as steps fitting an upper, attaching a welt to the lower edge portion of the upper by means of fasteners extending through the entire thickness of the welt preparing a sole by forming a marginal rabbet in its upper surface, said rabbet being of a cross-sectional size and shape substantially like that of the welt, applying cement to the surface of the rabbet, seating the welt in the rabbet with the upper surface of the welt substantially flush with the upper surface of the central part of the sole and with the edge of the upper in a plane above the upper surface of the sole, and sewing the sole to the welt.

2. That process of making footwear which comprises as steps fitting an upper, sewing a welt strip to the upper adjacent to the lower edge of the latter, the welt strip extending around the toe of the upper and along both sides of the upper, placing a flanged counter within the rear end of the upper, laying the edge of the rear part of the upper against the counter flange and securing it thereto by means of independent fasteners, placing a sole in contact with the welt, and attaching the welt to the sole by means of a sewed seam.

3. That process of making footwear which comprises as steps fitting an upper, sewing a welt strip to the upper adjacent to the lower edge of the latter, the welt strip extending around the toe of the upper and along both sides of the upper, placing a flanged counter within the rear end of the upper, laying the edge of the rear part of the upper against the counter flange and securing it to said flange, placing the welt in contact with a sole, sewing the welt to the sole, and attaching the counter flange to the sole.

4. That process of making footwear which comprises as steps fitting an upper, sewing a welt strip to the upper adjacent to the lower edge of the latter, the welt strip extending around the toe of the upper and along both sides of the upper, inserting a molded and flanged counter between the lining and outer member of the upper, laying the edge portion of both lining and outer member of the upper into contact with the counter flange, securing a sole to the welt strip, and passing fasteners through the sole and counter flange and the edge of both lining and outer member of the upper.

5. That process of making footwear which comprises as steps fittting an upper, attaching a welt to the inner surface of the upper adjacent to the lower edge portion of the latter, the welt projecting beyond said lower edge, connecting the upper to a sole, and causing the projecting portion of the welt to overlie the upper surface of the sole.

6. That process of making footwear which comprises as steps fitting an upper, attaching the thicker edge of a beveled welt to the inner surface of the upper adjacent to the lower edge portion of the latter, the thinner edge of the welt projecting beyond the edge of the upper, and connecting the upper to the sole and causing the thinner edge of the welt to overlie the upper surface of the sole.

7. That process of making footwear which comprises as steps fitting an upper, and applying welts to the inner and outer surfaces respectively of the upper adjacent to its lower edge, the outer welt extending upwardly from its connection to the upper and the inner welt having its upper margin stitched to the upper.

8. That process of making footwear which comprises making an upper, attaching welt strips to the inner and outer surfaces respectively of the upper adjacent to the lower edge of the latter, the inner welt projecting beyond the lower edge of the upper, turning in the lower portion of the upper, and attaching a sole to the outer welt strip.

9. That process of making footwear which comprises making an upper, attaching welts to the inner and outer surfaces respectively of the upper adjacent to the lower edge of the latter, the inner welt projecting beyond the lower edge of the upper, turning in the lower portion of the upper, attaching a sole to the outer welt, and securing the projecting portion of the inner welt to the sole.

10. That process of making footwear which comprises as steps fitting an upper, applying welts to the inner and outer surfaces respectively of the upper adjacent to its lower edge, the inner welt tapering in thickness toward its lower edge and projecting beyond the edge of the upper, turning in the lower portion of the upper and laying the outer welt into contact with a shoe sole, and uniting the outer welt to the sole.

11. That process of making footwear which comprises making an upper, attaching welt strips to the inner and outer surfaces respectively of the upper adjacent to the lower edge of the latter, the inner welt projecting beyond the lower edge of the upper, turning in the lower portion of the upper, attaching a sole to the outer welt, introducing a last into the upper, and ironing the upper while on the last.

12. A shoe upper having a welt strip engaging its inner surface adjacent to its lower edge, and a sewed seam uniting the welt and upper, said seam being nearer to the upper edge of the welt than to its lower edge.

13. An article of footwear comprising an upper, a welt strip engaging the inner surface of the upper adjacent to the lower edge of the latter, means uniting the welt strip to the upper, an outer sole, and means uniting the sole and welt strip.

14. An article of footwear comprising an upper, a welt strip engaging the inner surface of the upper, means uniting the welt strip and upper along a line adjacent to the lower edge of the upper, the welt strip projecting beyond the edge of the upper, the projecting portion of the strip tapering in thickness, and a sole, the projecting portion of the welt strip overlying the upper surface of the sole.

15. A shoe upper having welt strips engaging its inner and outer surfaces respectively adjacent to its lower edge, and means uniting said welt strips to the upper, said uniting means being adjacent to the upper edge of one of said strips and adjacent to the lower edge of the other strip.

16. A shoe upper having welt strips engaging its inner and outer surfaces respectively and extending along its lower edge, and a seam uniting both welt strips to the upper, said seam extending along the upper edge of the inner strip.

17. An article of footwear comprising an upper, welt strips engaging the inner and outer surfaces respectively of the upper, said strips being united to the upper adjacent to the lower edge of the latter, the inner strip projecting beyond the lower edge of the upper, a sole, and fastener elements uniting at least one of said welt strips to the sole, the other welt strip overlapping the upper surface of the sole.

18. An article of footwear comprising an upper, welt strips engaging the inner and outer surfaces respectively of the upper, said strips being united to the upper adjacent to the lower edge of the latter, a sole, stitches uniting the outer welt strip to the sole, the inner welt strip projecting beyond the edge of the upper and overlying the upper surface of the sole.

19. An article of footwear comprising an upper, welt strips engaging the inner and outer surfaces respectively of the upper, said strips being united to the upper adjacent to the lower edge of the latter, a sole, means attaching the outer welt strip to the sole, the inner welt strip projecting beyond the edge of the upper and tapering in thickness toward its free edge, the projection tapering portion of the inner welt strip overlying the upper surface of the sole.

20. An article of manufacture comprising an upper and a welt, one edge of the welt being substantially flush with the lower edge of the upper, a seam comprising stitches extending through the entire thickness of both welt and upper and substantially perpendicular to the plane of the welt, a sole having a marginal recess in its upper surface, the welt being disposed in said recess, and stitches passing perpendicularly through the entire thickness of the sole uniting the sole and welt.

21. An article of manufacture comprising an upper and a welt, one edge of the welt being substantially flush with the lower edge of the upper, a seam comprising stitches extending through the entire thickness of both welt and upper and substantially perpendicular to the plane of the welt, a sole having a marginal recess in its upper surface, the welt being disposed in said recess, the edge portion of the upper being above the recess, a sewed seam uniting the outer part of the welt to the sole, and a slip sole disposed upon the upper surface of said sole in the space defined by the edges of the upper.

22. An article of manufacture comprising an upper and a welt, one edge of the welt being substantially flush with the lower edge of the upper, a seam comprising stitches extending through both welt and upper, a sole having a marginal recess in its upper surface, the welt being disposed in said recess, means uniting the welt to the sole, an inner sole disposed upon the upper surface of said sole, and means attached to the inner surface of the upper for bridging the gap between the edge of the upper and the adjacent edge of the inner sole.

23. An article of manufacture comprising an upper and a welt, one edge of the welt being substantially flush with the lower edge of the upper, a seam comprising stitches uniting the welt and upper, a sole having a marginal recess in its upper surface, the welt being disposed in said recess, means uniting the welt to the sole, the edge of the upper being disposed in a plane above the upper surface of the sole, an inner sole disposed upon the upper surface of the sole, and an inner welt secured to the upper, said welt projecting inwardly from the edge of the upper and overlapping the edge of the inner sole.

24. An article of footwear comprising an upper having an outer member and a lining, a welt strip secured to the upper adjacent to the lower edge of the latter, a sole having a marginal rabbet in its upper surface, fastener means securing the welt in the rabbet in the sole, a flanged counter between the inner and outer members of the upper at the rear part of the latter, the edge of the upper at its rear part being disposed between the counter flange and sole, and fastener elements extending through the sole, upper and counter flange.

Signed by me at Boston, Massachusetts, this 16th day of February, 1927.

WILFRED T. TRACY.